United States Patent
McCall (10) Patent No.: US 6,658,435 B1
(45) Date of Patent: Dec. 2, 2003

(54) DISK IMAGE BACKUP/RESTORE WITH DATA PREPARATION PHASE

(75) Inventor: Colin David McCall, Glasgow (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/575,586

(22) Filed: May 22, 2000

(30) Foreign Application Priority Data

Aug. 24, 1999 (GB) .............................................. 9919929

(51) Int. Cl.$^7$ .............................................. G06F 12/00
(52) U.S. Cl. ...................... 707/204; 707/202; 707/205; 711/162; 717/174
(58) Field of Search ................................. 707/204, 205, 707/202; 711/161, 162; 717/174, 175, 176, 177, 178

(56) References Cited

U.S. PATENT DOCUMENTS

| | | | |
|---|---|---|---|
| 5,265,159 A | * 11/1993 | Kung ............................ | 380/4 |
| 5,274,807 A | 12/1993 | Hoshen et al. ............... | 707/205 |
| 5,438,671 A | 8/1995 | Miles .......................... | 709/247 |
| 5,991,542 A | * 11/1999 | Han et al. .................... | 717/167 |
| 6,073,220 A | * 6/2000 | Gunderson ................... | 711/162 |
| 6,080,207 A | * 6/2000 | Kroening et al. ............. | 717/11 |
| 6,108,147 A | * 8/2000 | Jeon ............................ | 360/15 |
| 6,108,697 A | * 8/2000 | Raymond et al. ............ | 709/218 |
| 6,179,492 B1 | * 1/2001 | Guy et al. ................... | 717/169 |
| 6,253,300 B1 | * 6/2001 | Lawrence et al. ........... | 711/173 |
| 6,366,987 B1 | * 4/2002 | Tzelnic et al. .............. | 711/162 |
| 6,385,707 B1 | * 5/2002 | Maffezzoni ................. | 711/162 |
| 2003/0061456 A1 | * 3/2003 | Ofek et al. .................. | 711/162 |

FOREIGN PATENT DOCUMENTS

| EP | 0 361 683 A2 | 4/1990 | ............ G06F/11/14 |
|---|---|---|---|
| WO | WO 99/18505 | * 4/1999 | ............ G06F/11/00 |

OTHER PUBLICATIONS

Hutchinson, Norman, "Logical vs. Physical File System Backup", Proceeding of the 3rd Symposium on Operating Systems Design and Implementation, Feb., 1999,11pages.*
IBM Technical Disclosure Bulletin vol. 35, No. 5, Oct. 1992, "Method For Performing a Selective Physical Backup of a Shared File System Storage Group", pp. 39–41.

* cited by examiner

*Primary Examiner*—John Breene
*Assistant Examiner*—Khanh Pham
(74) *Attorney, Agent, or Firm*—Martin J. McKinley (57) ABSTRACT

A method for backing up data stored using a filing system on a computer non-volatile storage device is described. First pre-defined signature data is written, using the filing system, to substantially all of the unused portion of the computer non-volatile storage device. The data stored on the computer non-volatile storage device is then backed up, independent of the filing system. Data consisting of the first pre-defined signature is not backed up. In this manner, a backup is completed without access to the filing system, but which backs up only portions of the non-volatile storage medium which are in use.

21 Claims, 6 Drawing Sheets

DISK IMAGE BACKUP/RESTORE WITH DATA PREPARATION PHASE

FIELD OF THE INVENTION

The present invention relates generally to backup of data from computer non-volatile storage and more particularly to backup of data by a program without access to the filing system associated with the computer non-volatile storage.

BACKGROUND OF THE INVENTION

Personal computer systems are well known in the art. Personal computer systems in general, and IBM Personal Computers in particular, have attained widespread use for providing computer power to many segments of today's modern society. These systems are designed primarily to give independent computer power to a single user and are inexpensively priced for purchase by individuals or small businesses. Personal computers can typically be defined as desktop, floor standing, or portable computers that consist of a system unit having a single central processing unit (CPU) and associated volatile and non-volatile memory, including RAM and BIOS ROM.

Conventionally, data backup and restore programs fall into two categories, those that are file-system dependent and those that are file-system independent. In a file-system dependent backup, the backup program, with access to the file system, copies one file at a time to a backup medium. The program collects together the pieces of each of the files, which may not be contiguously stored on the disk, and stores the entirety of each file in one contiguous portion on the backup medium. In a file-system independent backup, the backup program copies the complete contents of the physical medium regardless of whether or how it is used by the file system. The complete contents of the medium to be backed up is read sequentially.

A problem with the file-system dependent method is that the backup program must have access to a driver program in order to interpret the file system structure, for each and every file system for which it is expected to back up files from. It has to know all the file systems that it will have to backup files from, including any security or other access restrictions, and in some cases, such as Microsoft's NTFS, have access to proprietary and unpublished specifications. For this reason, file-system dependent backup processes are generally only written to run under a 'production' operating system that has the correct file access built in. If the medium being backed up is the boot drive of a system, it cannot be restored in the event of failure unless an alternative boot source for the same operating system is available. So the file-system independent method is more generally used for boot drive backups.

A problem with the file-system independent method is that it has no way of knowing which sectors of the physical medium are unused by the file system, so it must back up and restore the whole of the medium. This is slow and wasteful of backup space if the original medium is only partly used, as is the normal case.

It is possible to determine cluster usage in order to identify portions of the original medium which are not used, but this requires operating system file knowledge.

The Drive Image product from Powerquest Inc. does perform a back up of the major operating systems. However, this product relies on knowledge of the file system and requires modifications to support any new file systems.

It would be advantageous if data could be backed up without access to the filing system, but in such a way that areas of the original medium not used by the filing system were not backed up.

It is well known that a complete operating system and required applications can be quickly installed on a personal computer by copying the hard drive partition sector-by-sector from a known good installed system to a new system. This process, known as 'cloning', is independent of the specific operating system or file system in use (the 'target' operating system), so can be carried out by a program running under a different operating system (a 'service' operating system). For example Microsoft Windows NT or Novell Netware can be copied by a program running under DOS booted from a network or diskette, even though DOS can not access the individual files.

A problem arises when it is necessary to personalise some files before the target operating system boots. Typically, some parameters such as the system name or network address must be changed to make the system unique on the network. Since DOS cannot access the file system, it cannot modify the specific files required to personalise the system.

DISCLOSURE OF THE INVENTION

Accordingly, the present invention provides a method for backing up data stored using a filing system on a computer non-volatile storage device, the method comprising the steps of: writing, using the filing system, pre-defined first signature data to substantially all of the unused portion of the computer non-volatile storage device; backing up, independent of the filing system, the data stored on the computer non-volatile storage device, data consisting of the pre-defined first signature not being backed up.

The present invention solves the problems of the prior art by splitting the backup process into two phases, a file-system dependent data preparation phase and a file-system independent binary image backup and restore process. The advantage of this is that the space taken by the backup is much less than if every sector is backed up, and the time taken to restore is much less. The time taken to perform both phases of backup is not much different from a complete backup of the medium.

Space saving can be achieved in the prior art by compression only, but without the preparation phase the unused areas of the medium can be expected to contain old data that is not particularly compressible, so the space saving will be less.

In a preferred embodiment, the writing step comprises the steps of: creating a file on the computer non-volatile storage device; writing pre-defined first signature data until the unused portion of the computer non-volatile storage device is full; closing the file; and deleting the file.

Deletion of the file does not delete the data, it merely marks the space used by the data as available for reuse. Unless updates have been made to files or new files added to the computer system non-volatile storage, then the data contained within the area previously occupied by the deleted file will still be present.

Preferably, the step of backing up includes a step of compression of the data to be backed up.

In a variation of the preferred embodiment, data consisting of the pre-defined first signature is backed up; and the pre-defined first signature and the compression algorithm are chosen such that the pre-defined first signature compresses to a high degree.

The use of the pre-defined signature means that unused areas of the non-volatile storage medium can be compressed to a higher degree than is possible with the prior art.

In another embodiment, the writing of the pre-defined first signature data is done prior to installation of the operating system.

This has the advantage that ares of the non-volatile storage medium claimed by the operating system for use as, for example, a swap file, but not actually used by the operating system, are not backed up.

In a further embodiment, the method further comprises the steps, prior to said backing up step, of: identifying, using the filing system, files on a first computer which need to be personalised for a particular computer; backing up, using the filing system, the files which need to be personalised for a particular computer; personalising the backed up copy of the files which need to be personalised for a particular computer such that the personalisation is for another computer; writing, using the filing system, of second pre-defined signature data to the files on the first system which need to be personalised; and further comprising the steps, after said backing up step, of: scanning each portion of the backed up data for the presence of the second pre-defined signature; responsive to the second pre-defined signature not being found in a portion, restoring that portion of the backed up data to a second computer; and responsive to the second pre-defined signature being found in a portion, restoring the previously personalised files to that portion of the second computer.

The invention also provides a data processing system comprising: a non-volatile storage device; a filing system associated with the non-volatile storage device; means for writing, using the filing system, pre-defined first signature data to substantially all of the unused portion of the computer non-volatile storage device; means for backing up, independent of the filing system, the data stored on the computer non-volatile storage device, data consisting of the pre-defined first signature not being backed up.

The invention further provides a computer program product for use in a data processing system having a non-volatile storage medium, the computer program product comprising: a computer usable medium having computer readable program code means embodied in said medium for backing up data stored using a filing system, said computer program product having: computer readable program code means for writing, using the filing system, pre-defined first signature data to substantially all of the unused portion of the computer non-volatile storage device; and computer readable program code means for backing up, independent of the filing system, the data stored on the computer non-volatile storage device, data consisting of the pre-defined first signature not being backed up.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
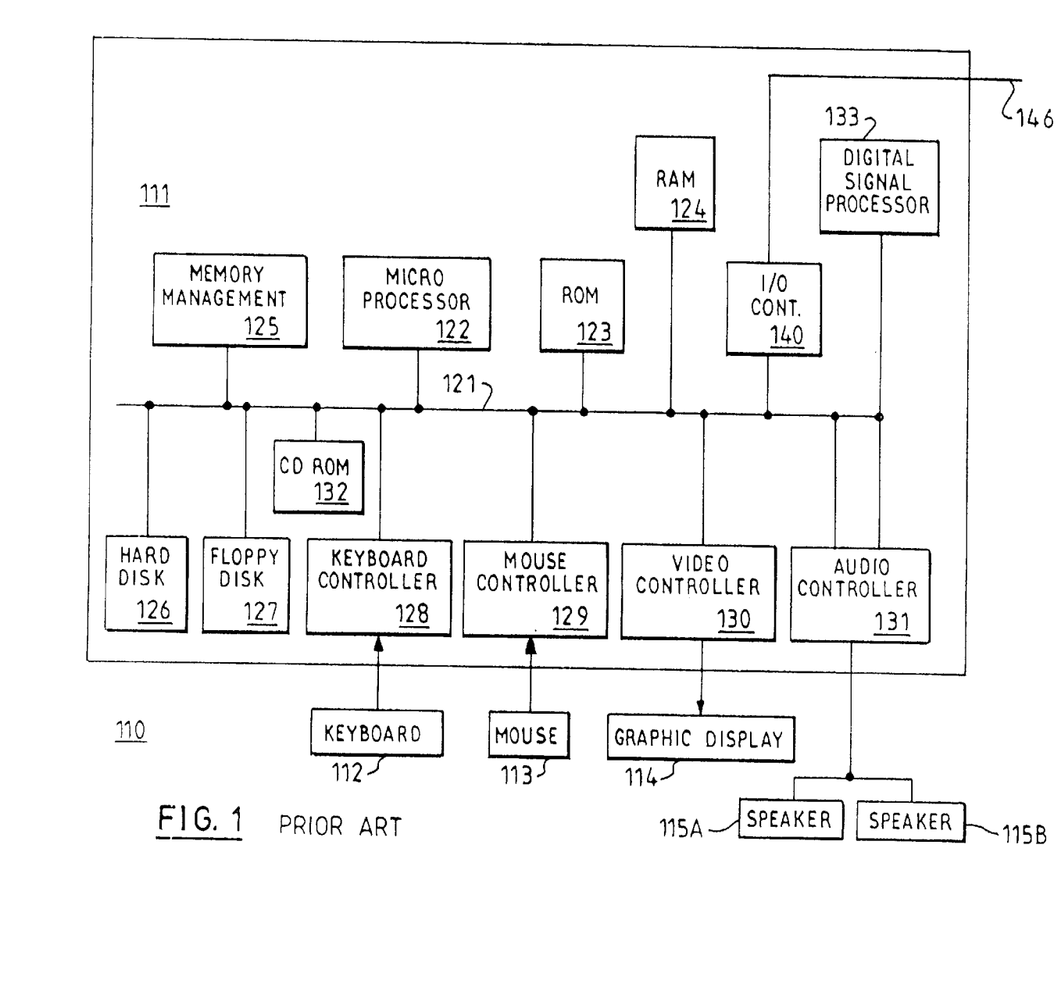
FIG. 1 is a block diagram of a prior art computer system in which the present invention may be used.

In FIG. 1, a prior art computer 110, comprising a system unit 111, a keyboard 112, a mouse 113 and a display 114 are depicted in block diagram form. The system unit 111 includes a system bus or plurality of system buses 121 to which various components are coupled and by which communication between the various components is accomplished. The microprocessor 122 is connected to the system bus 121 and is supported by read only memory (ROM) 123 and random access memory (RAM) 124 also connected to system bus 121. In many typical computers the microprocessors including the 386, 486 or Pentium microprocessors (Intel and Pentium are trademarks of Intel Corp.). However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 123 contains among other code the Basic Input-Output system (BIOS) which controls basic hardware operations such as the interaction between the CPU and the disk drives and the keyboard. The RAM 124 is the main memory into which the operating system and application programs are loaded. The memory management chip 125 is connected to the system bus 121 and controls direct memory access operations including, passing data between the RAM 124 and hard disk drive 126 and floppy disk drive 127. The CD ROM 132 also coupled to the system 121 is used to store a large amount of data, e.g. a multimedia program or presentation. CD ROM 132 may be an external CD ROM connected through an adapter card or it may be an internal CD ROM having direct connection to the motherboard.

Also connected to this system bus 121 are various I/O controllers: the keyboard controller 128, the mouse controller 129, the video controller 130 and the audio controller 131. As might be expected, the keyboard controller 128 provides the hardware interface for the keyboard 112, the mouse controller 129 provides the hardware interface for mouse 113, the video controller 130 is the hardware interface for the display 114, and the audio controller 131 is the hardware interface for the speakers 115a and 115b. An I/O controller 140 such as a Token Ring adapter card enables communication over a network 146 to other similarly configured data processor systems. These I/O controllers may be located on the motherboard or they may be located on adapter cards which plug into the motherboard, either directly or into a riser card. The adapter cards may communicate with the motherboard using a PCI interface, an ISA or EISA interface or other interfaces.

Figure 2:
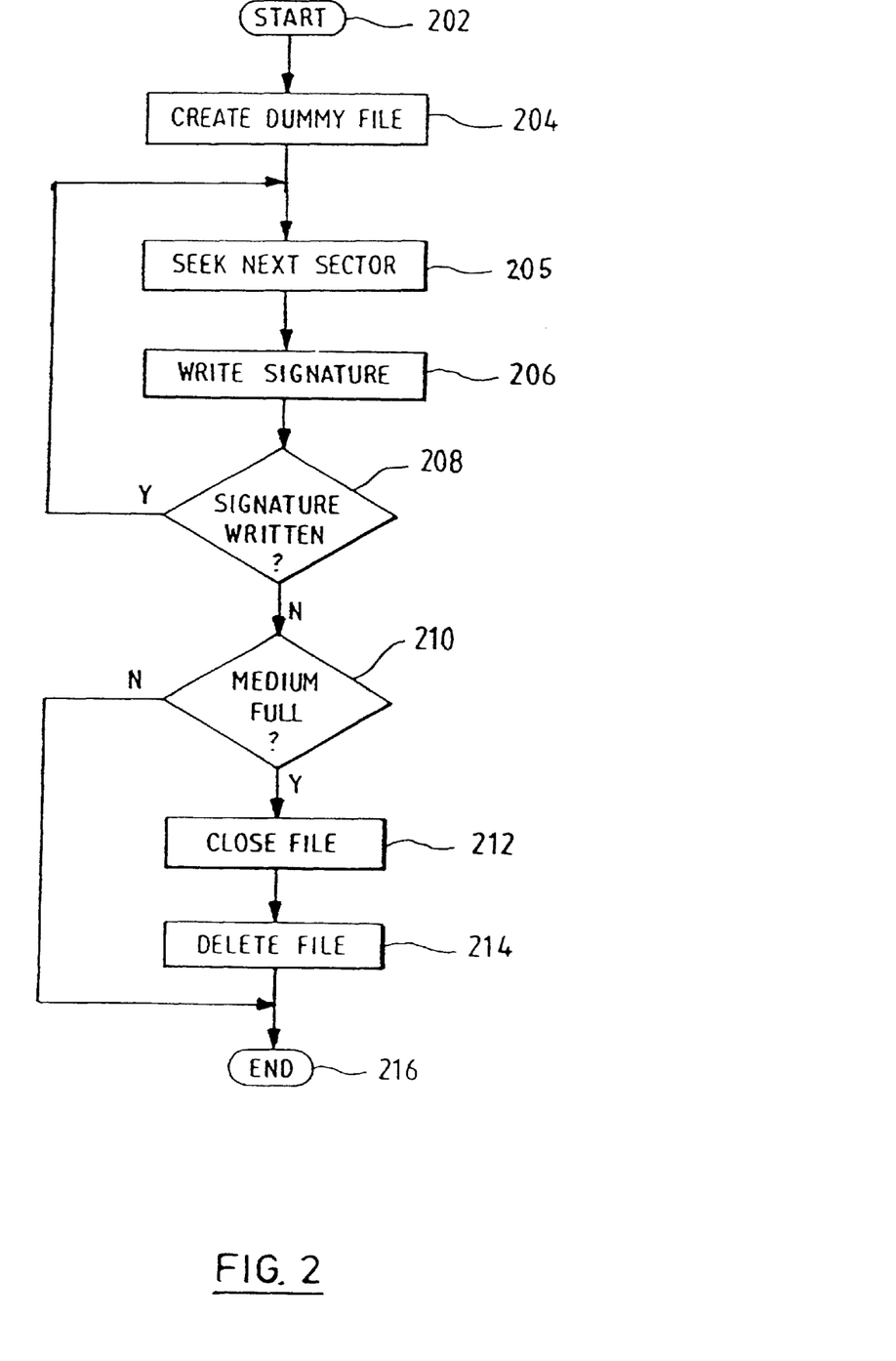
FIG. 2 is a flowchart of the first phase of a backup program according to the present invention.

FIG. 2 shows the first phase of a backup program which runs under the normal operating system, which allows access to the file system. The program has the effect of marking all the unused space on the medium with a distinctive signature by creating a large file which completely fills all the unused space on the medium, then deleting the file. The deletion call does not destroy the signature on the physical medium, but just makes the space available for use again. This preparation phase can be implemented in a very simple program written in the C language that just has to be re-compiled for each operating system.

The program starts at step 202. At step 204, a dummy file is created using standard file creation calls to the operating system. At step 205, the next sector to be checked is found. If the file has just been opened, then the first sector is found. At step 206 a distinctive signature is written to the file using standard file writing calls to the operating system. At step 208, a check is made, using standard operating system calls, to see if the filing system successfully wrote the signature bytes to the file. If the write was successful, then processing returns to step 205. If the write was not successful, then, at step 210, a check is made to see if the write was not successful because the medium was full. If the write was not successful for reasons other than that the medium was full, then the program exits with an error at step 216. If the write was not successful because the medium was full, then at step 212, the file is closed using standard file closure calls to the operating system. At step 214, the file is deleted using standard file deletion calls to the operating system. The program exits at step 216.

If the operating system cannot create a single file to fill the space, multiple files are created. The multiple files are then deleted in the same manner as for a single file. This phase can reclaim space which was used by install files which are deleted after installation of the operating system.

Figure 3:
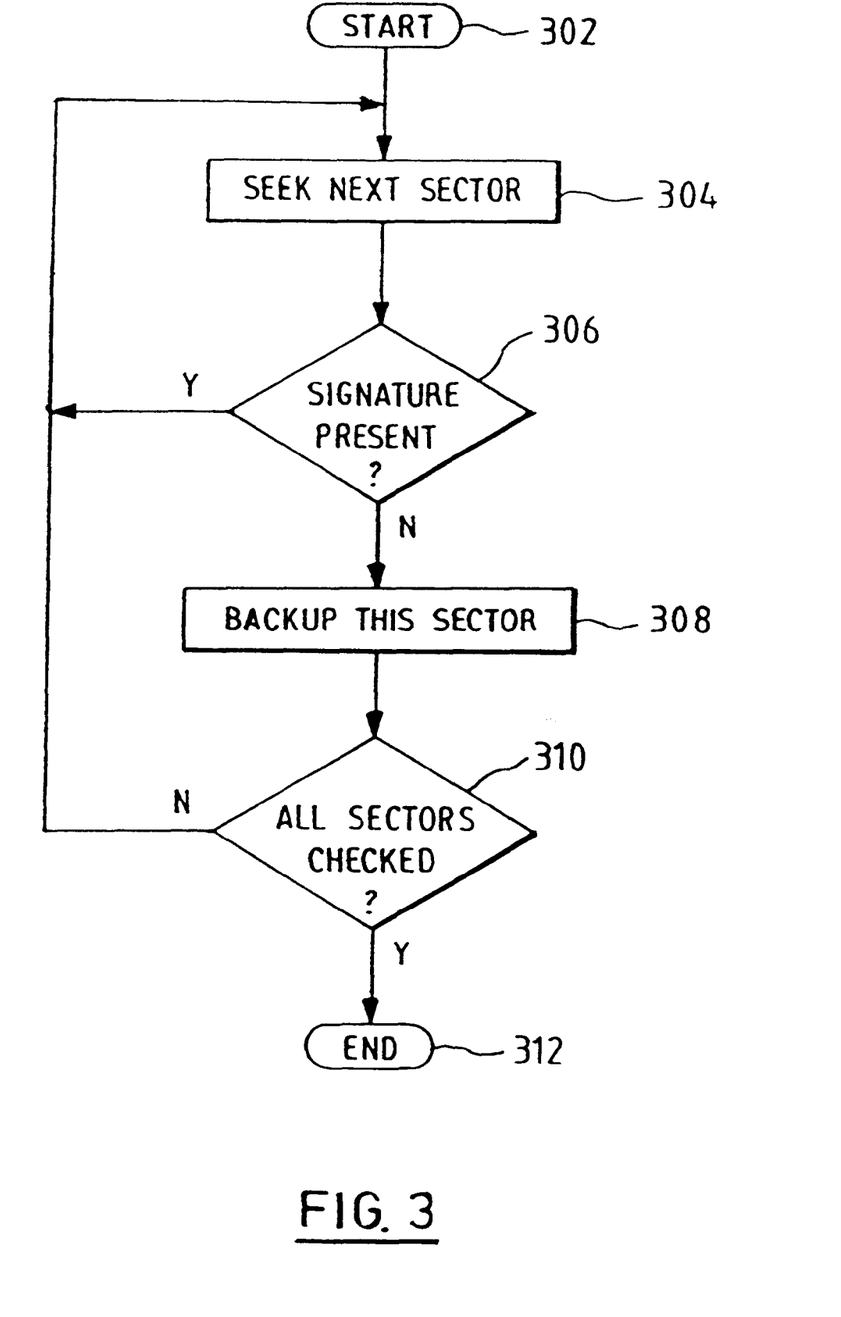
FIG. 3 is a flowchart of the second phase of a backup program according to the present invention.

FIG. 3 shows the second phase of a backup program which is file-system independent, and is run from a 'Service Operating System', such as, for example, a DOS program running from a diskette or network boot. Alternatively, the second phase of the backup program may be built into the system firmware as a BIOS function or as a BIOS extension in adapter firmware. The backup and restore phases can be programmed so as to use BIOS calls only so that they can be run from system firmware. The second phase of the backup program searches the source medium for sectors that do not contain the signature, and backs up only those sectors. The restore program only restores used sectors.

The backup program may backup the data to a specially created partition of the same drive or it may backup data to another backup medium such as a tape drive, disk drive or a server-based storage medium.

The program starts at step 302. The first sector is found at step 304. A check is made at step 306 to see if the pre-defined signature is present. If the pre-defined signature is present, then execution returns to step 304, where the next sector is found. The presence of the pre-determined signature means that this sector has not actually been written to since the first preparation phase of the backup program was run and that this sector does not need to be backed up. If the pre-defined signature is not present, then at step 308, the sector is backed up. A check is made, at step 310, to see if all the sectors have been checked for the presence of the pre-defined signature. If all sectors have been checked, then the program exits at step 312. If there are further sectors to check, then execution continues at step 304, where the next sector is found. Prior to step 308, the data to be backed up may be compressed using any known compression algorithm. This provides additional saving of backup storage space.

A variation of the program of FIG. 3 is now described by means of the following pseudo-code. In this variation, a first pass read of all the sectors is completed to scan data for sectors which have been used, followed by a second pass read, during which the backup is done. This varies from the program of FIG. 3, which checks each sector, one at a time, to see if it has been used and then backs up that sector if it has been used, then moves on to the next sector. The following example backs up the data to another partition on the same storage medium.

The following values are parameters that can be varied:
BLOCKSIZE—the number of 512 byte disk sectors read in a single operation—normally 127—the maximum disk read supported by the operating system
COMPRESSION—true or false—whether compression is required

```
Backup program
Initialize a bitmap with 1 bit for every block,
initialized to zeros
data size = 0
/* first pass read - scan data for used sectors */
For every block from 0 to (totalsectors/BLOCKSIZE)
    Read BLOCKSIZE sectors
    For every sector from 0 to BLOCKSIZE
        If sector does not contain signature then
            block is used
            exit
        if block is used
            if COMPRESSION, compute compressed size of block
            add data size (perhaps compressed) to data size
            set bit in bitmap
Check that space available for backup > data size
            exit with error if not enough space available
Create partition for backup, or grow backup partition if
required
/* second pass - do backup */
For every block from 0 to (totalsectors/BLOCKSIZE)
    if block is used
        Read BLOCKSIZE sectors
        if COMPRESSION, compress data
        move data to intermediate buffer
        if buffer full
            write to output
```

Figure 4:
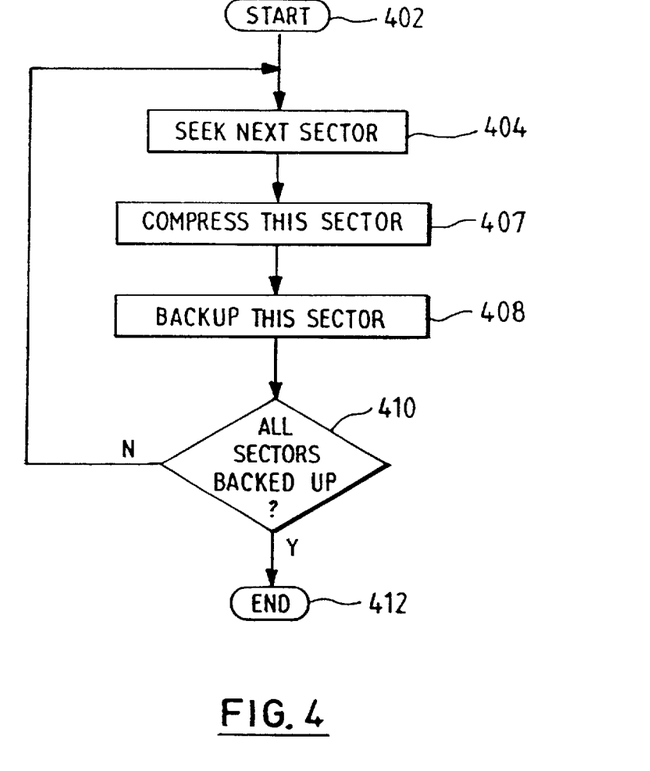
FIG. 4 is a flowchart of an alternative embodiment of the second phase of a backup program according to the present invention.

FIG. 4 shows an alternative embodiment, in which every sector is backed up, but data compression is used to save space. In this case the advantage of the preparation phase is that the 'signature' is made highly compressible, so that the unused space is compressed to take up very little space on the backup medium. When the backup logical image is decompressed and restored, every sector is restored, whether used or not.

The program starts at step 402. The first sector is found at step 404. The sector is compressed at step 407. Note that no check is made for the presence of the pre-defined signature. The benefit of the pre-defined signature having previously been written is that it is chosen such that a high degree of compression is obtained. At step 408, the sector is backed up. A check is made, at step 410, to see if all the sectors have been backed up. If all sectors have been backed up, then the program exits at step 412. If there are further sectors to back up, then execution continues at step 404, where the next sector is found.

In practice, backing up only the used areas gives the best restore performance and data compression gives the best space savings. The two can be combined in various ways to give the best overall performance depending on requirements.

When it is desired to restore the data which was backed up, then a restore program is run. The restore program will now be described using the following pseudo-code.

Restore Program

```
do until backup partition empty
    Read data from backup to buffer
    For every block in buffer
        if COMPRESSION, decompress
        write data to target partition
```

In a variation of the preferred embodiment, an extra preparation phase is used in which the entire medium is filled with the pre-defined signature before the production operating system is installed. In this case additional space and time savings are made because some space which is claimed by the file system and so unavailable for writing by the post-operating system installation preparation phase, described with reference to FIG. 2, is not actually utilised by the operating system. This includes unused space within file system 'clusters', where the file system manages its medium in clusters of typically 4K to 16 Kbytes, but physical writes are done in typically 512 byte sectors. So very small files leave substantial areas of disk unused. Likewise, the operating system might claim a large area of the file system for its swap file at installation, but not use it until the user's applications are run. So if the system is being backed up in its newly installed state the swap file is untouched. These areas remain marked by the signature if the pre-operating system installation disk preparation phase is used, but are not accessible to the post-operating system preparation phase.

The pre-operating system preparation phase runs from a DOS boot, either from diskette or a network boot, and writes every sector of a system's hard drive with a pre-defined signature. In the preferred embodiment, this consists of the ASCII characters 'rAvE9955' followed by all binary zeros. This phase lays down signatures on all sectors including those that will subsequently be claimed but remain unused by the OS file system. The normal disk partitioning, format, and operating system and application install process is then carried out, and all installation files that are no longer required are deleted.

Figure 5:
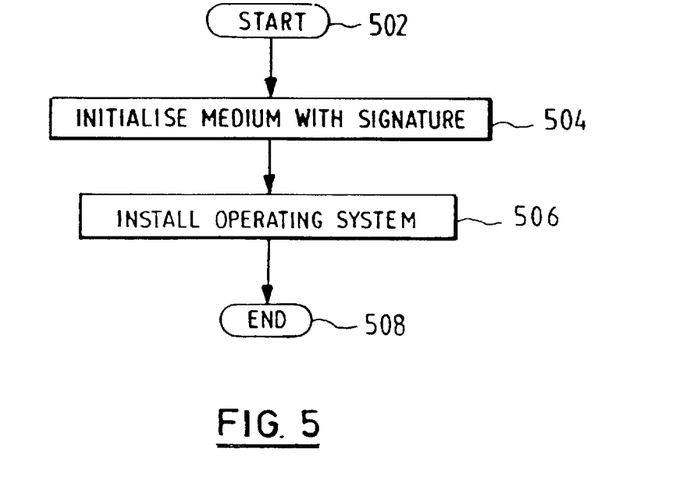
FIG. 5 is a flowchart of an optional pre-operating system installation phase of a backup program according to the present invention.

FIG. 5 shows the extra preparation phase. The program starts at step 502. The medium is initialised with the pre-defined signature at step 504. The operating system is then installed at step 506. The program ends execution at step 508.

In another embodiment of the present invention, the problem of personalisation of some files associated with a target operating system before the target operating system boots is addressed. During "cloning", a service operating system copies data sector by sector onto a target system, but does not understand the data or its relationship to other data being copied to form files. Typically, some parameters such as the system name or network address must be changed to make the target system unique on a network. This embodiment uses three programs. A personalisation program that runs under the target operating system, and backup and restore programs that run under the service operating system.

Figure 6:
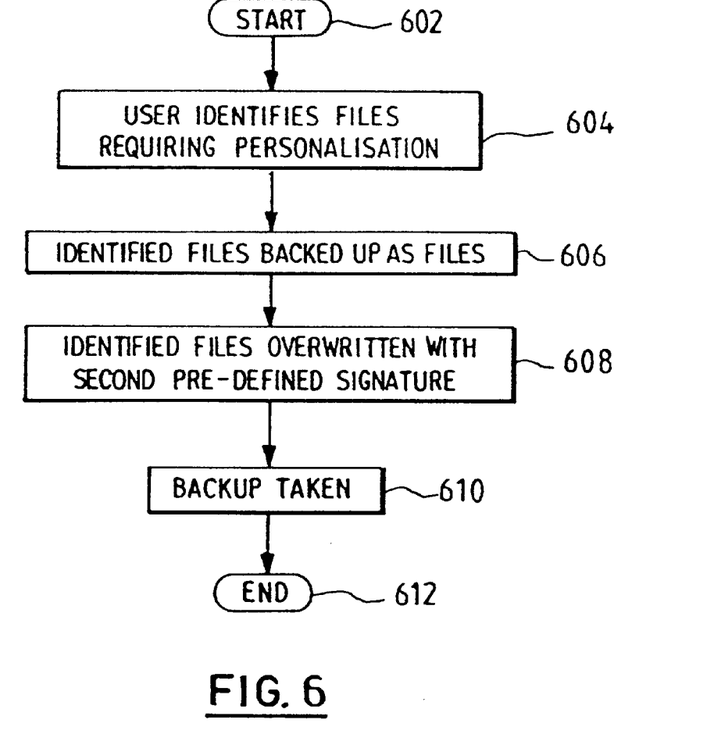
FIG. 6 is a flowchart of a backup program according to a further embodiment of the invention.

The backup program running under the service operating system will now be described with reference to FIG. 6. The program starts at step 602. At step 604, the user first determines files that have to be personalised after cloning (the 'personality' files), determines the maximum size each file has to be on the target system, and at step 606, creates backup copies of the files in a form that is accessible to the service operating system, for example, stored on a diskette drive or a networked drive.

When the file system creates a file, it allocates blocks on the physical drive to store the data. How the blocks are allocated and indexed is different for different file systems and in some cases (like NTFS) this information is not published. Most file systems will allocate consecutive blocks if possible, but this may not be possible so is not relied on in the present invention.

At step 608, on the source system, the personalisation program overwrites each of the personality files with a sequence of 512 byte blocks. Each block contains (i) a distinctive signature common to all files to be personalised; (ii) the name of the file; and (iii) a block number indicating the sequence of blocks in the file. The source system is then shut down. At step 610, a backup of the source system is taken, sector by sector. The created backup may use the programs of FIGS. 2 and 3 or FIGS. 2 and 4 in order to create a backup which takes up a minimum of space and a minimum of time to restore. The program ends at step 612.

Figure 7:
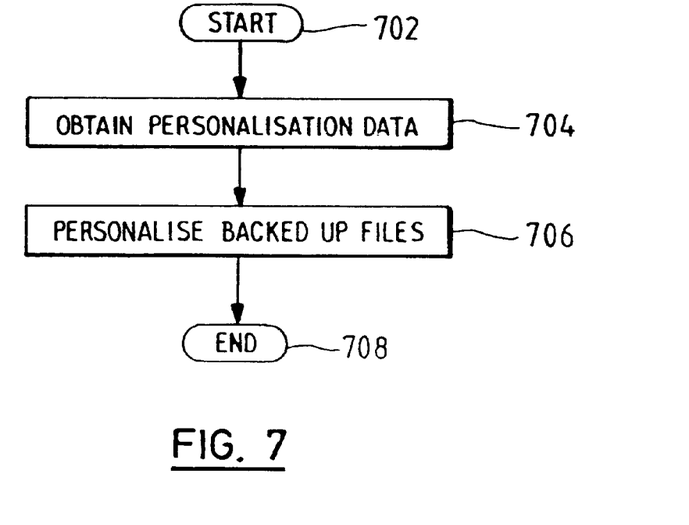
FIG. 7 is a flowchart of a personalisation program according to the further embodiment of the invention.

The personalisation program will now be described with reference to FIG. 7. The program starts at step 702. At step 704, the information that is required to be added to the personalisation file is obtained. At step 706, copies of the personality files are modified for the target machine, and made accessible to the cloning program. The program ends at step 708.

The files for cloning onto the target system have now been prepared. The files include a sector by sector backup image of the source system, prepared by the program of FIG. 6, with the sectors associated with files containing information that requires to be personalised for the target system containing only a second pre-defined signature. The files also include a file by file backup of the files, prepared by the program of FIG. 7, containing information that requires to be personalised, the files having been personalised for the target system.

Figure 8:
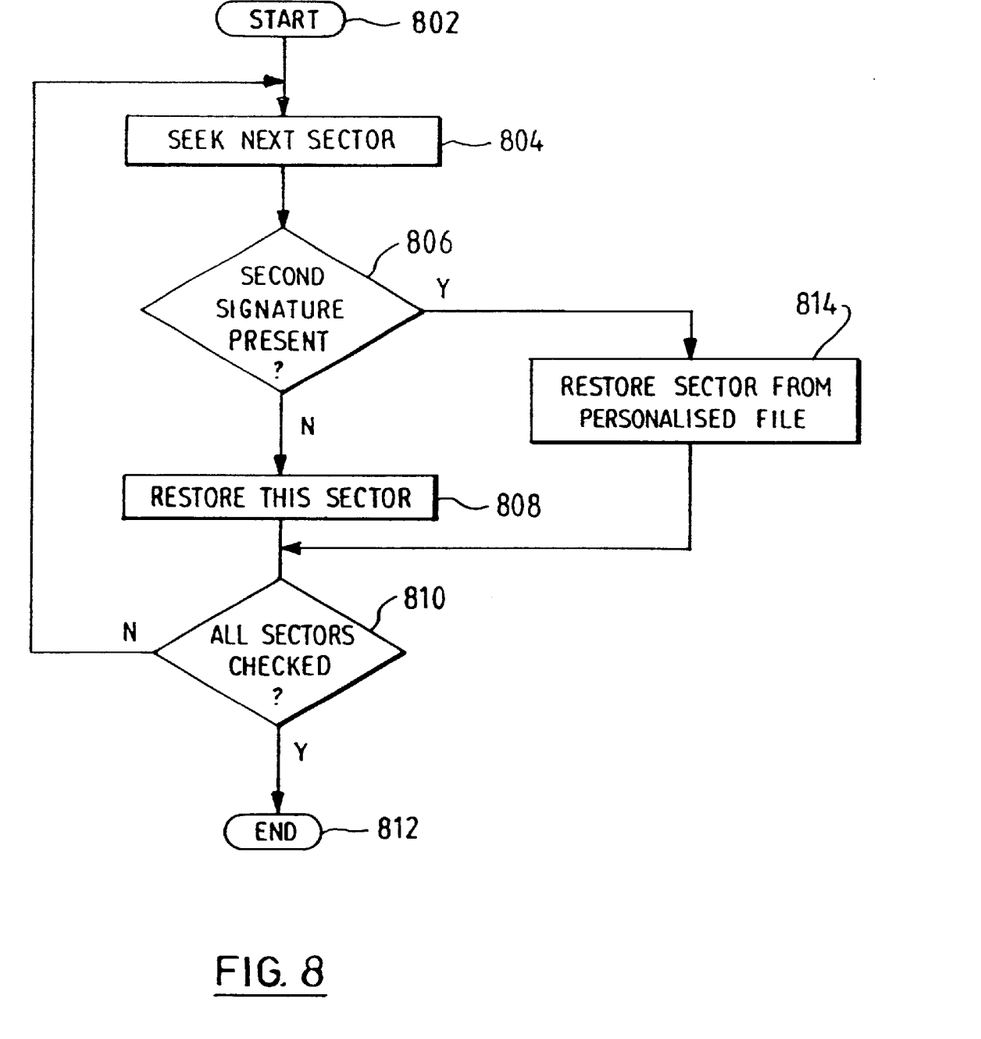
FIG. 8 is a flowchart of a restore program according to the further embodiment of the invention.

The cloning program will now be described with reference to FIG. 8. The program starts at step 802. The cloning program copies the backup, sector by sector, to the target system's hard drive, but at step 806 scans each sector before it is written to check for the distinctive signature. Steps 804, 808 and 810 correspond to steps 304, 308 and 310 of FIG. 3 or to steps 404, 407, 408 and 410 of FIG. 4. Whenever the distinctive signature is found, it replaces, at step 814, the sector with the corresponding block, indicated by the block number, from the personality file of the same name. The cloning program does not need to know anything about how the target file system allocates or indexes the sectors, as it addresses them only by content. The program ends at step 812.

There is a remote possibility that a sector of another file could match the required format including both the signature and a valid file name. In this case, the file would be corrupted. However, by making the signature sufficiently distinctive, this risk becomes negligible.

The present invention will not work if the personality file must be an exact size that is not a multiple of 512 bytes. This case is rare, since in most cases these files are plain ascii text where trailing white space is ignored. In other cases, some program on the target may have to be provided to convert the file into the correct format before it is needed by the system.

A side effect of the present invention is that the source machine will not be bootable after it has been prepared, since its personality files have been overwritten. To repair it, the cloning program is run in a special mode that just replaces the original files without restoring the backup.

While preferred embodiments of the invention have been described above, it will be appreciated that many variations and modifications may be made to these embodiments without departing from the scope of the invention.

What is claimed:

1. A method comprising the steps of:
   preparing a computer having a non-volatile storage device with a filing system thereon for backup by creating a file on the computer non-volatile storage device using the filing system;
   writing, first pre-defined signature data using the filing system to substantially all of the unused portion of the computer non-volatile storage device until the unused portion of the computer non-volatile storage device is full;
   closing the file;
   deleting the file; and
   backing up, independently of the filing system, the data stored on the computer non-volatile storage device which is other than the data consisting of the first pre-defined signature.

2. A method as claimed in claim 1 wherein the step of backing up includes a step of compression of the date to be backed up.

3. A method as claimed in claim 2, wherein:
   data consisting of the first pre-defined signature is backed up; and
   the first pre-defined signature and the compression algorithm are chosen such that the first pre-defined signature compresses to a high degree.

4. A method as claimed in claim 1, wherein the writing of the first pre-defined signature data is done prior to installation of the operating system onto the computer non-volatile storage device.

5. A method as claimed in claim 1, further comprising the steps, prior to said backing up step, of:
   identifying, using the filing system, files on a first system which need to be personalised for a particular computer;
   backing up, using the filing system, the files which need to be personalised for a particular computer;
   personalising the backed up copy of the files which need to be personalised for a particular computer such that the personalisation is for another computer;
   writing, using the filing system, second pre-defined signature data to the files on the first system which need to be personalised; and
   further comprising the steps, after said backing up step, of:
      scanning each portion of the backed up data for the presence of the second pre-defined signature;
      responsive to the second pre-defined signature not being found in a portion, restoring that portion of the backed up data to a second computer; and
      responsive to the second pre-defined signature being found in a portion, restoring the previously personalised files to that portion of the second computer.

6. A method as claimed in claim 5 wherein the second pre-defined signature comprises:
   a distinctive signature;
   a file name; and
   a sequential block number.

7. A method as claimed in claim 1, wherein the step of backing up is executed from a program running under the DOS operating system.

8. A method as claimed in claim 1, wherein the step of backing up is executed using BIOS functions.

9. A method as claimed in claim 1, wherein the step of backing up is executed using BIOS extensions.

10. A method as claimed in claim 1, wherein the data is backed up to another partition of the computer non-volatile storage medium.

11. A method as claimed in claim 1, wherein the data is backed up to a separate non-volatile storage device.

12. A data processing system comprising:
    a non-volatile storage device;
    a filing system associated with the non-volatile storage device;
    a backup preparation program element executing on the system and preparing the system for backup by creating a file on said non-volatile storage device using said filing system, the backup preparation program element writing, first pre-defined signature data using said filing system to substantially all of the unused portion of the computer non-volatile storage device until the unused portion of said non-volatile storage device is full, closing the file and deleting the file; and
    a backup program element executing on the system and backing up, independently of the filing system, the data stored on the computer non-volatile storage device which is other than data consisting of the first pre-defined signature.

13. A system as claimed in claim 12 wherein said backup program element includes an element which compresses the data to be backed up.

14. A system as claimed in claim 13, wherein:
    data consisting of the first pre-defined signature is backed up; and
    the first pre-defined signature and the compression algorithm are chosen such that the first pre-defined signature is compressed by the compression element to a high degree.

15. A system as claimed in claim 12, wherein the system further comprises an operating system and further wherein said backup preparation program element writes the first pre-defined signature data prior to installation of the operating system.

16. A system as claimed in claim 12, further comprising:
    means for identifying, using the filing system, files on a first system which need to be personalised for a particular computer;
    second means for backing up, using the filing system, the files which need to be personalised for a particular computer;
    means for personalising the backed up copy of the files which need to be personalised for a particular computer such that the personalisation is for another computer;
    means for writing, using the filing system, second pro-defined signature data to the files on the first system which need to be personalised; and
    further comprising, responsive to said backup program element:
       means for scanning each portion of the backed up data for the presence of the second pre-defined signature;
       responsive to the second pre-defined signature not being found in a portion, means for restoring that portion of the backed up data to a second computer; and
       responsive to the second pre-defined signature being found in a portion, means for restoring the previously personalised files to that portion of the second computer.

17. A computer program product comprising:
    a computer usable medium;

a backup preparation program element embodied in said medium and executable on a computer system to prepare the system for backup by creating a file on a non-volatile storage device using a filing system, the preparation program element writing first pre-defined signature data using said filings system to substantially all of the unused portion of the computer non-volatile storage device until the unused portion of said non-volatile storage device is full, closing the file and deleting the file; and a backup program element executing on the system and backing up, independently of the filing system, the data stored on the computer non-volatile storage device which is other than data consisting of the first pre-defined signature.

18. A computer program product as claimed in claim 17, wherein said backup program element includes computer program code for compression of the data to be backed up.

19. A computer program product as claimed in claim 18, wherein:

data consisting of the first predefined signature is backed up; and the first pre-defined signature and the compression algorithm are chosen such that the first pre-defined signature is compressed to a high decree by the computer program compression code.

20. A computer program product as claimed in claim 17, wherein said backup program preparation element writes the first pre-defined signature data prior to installation of an operating system on the data processing system non-volatile storage device.

21. A computer program product as claimed in claim 17, further comprising:

computer readable program code means for identifying, using the filing system, files on a first system which need to be personalised for a particular computer;

second computer readable program code means for backing up, using the filing system, the files which need to be personalised for a particular computer;

computer readable program code means for personalising the backed up copy of the files which need to be personalised for a particular computer such that the personalisation is for another computer;

computer readable program code means for writing, using the filing system, second pre-defined signature data to the files on the first system which need to be personalised; and further comprising, responsive to said backup program element:

computer readable program code means for scanning each portion of the backed up data for the presence of the second pre-defined signature;

responsive to the second pre-defined signature not being found in a portion, computer readable program code means for restoring that portion of the backed up data to a second computer; and responsive to the second pre-defined signature being found in a portion, computer readable program code means for restoring the previously personalised files to that portion of the second computer.

* * * * *